United States Patent
Hallapuro et al.

(10) Patent No.: US 10,515,134 B2
(45) Date of Patent: Dec. 24, 2019

(54) IMPLEMENTATION OF A TRANSFORM AND OF A SUBSEQUENT QUANTIZATION

(75) Inventors: Antti Hallapuro, Tampere (FI); Kim Simelius, Tampere (FI)

(73) Assignee: Nokia Technologies Oy, Espoo (FI)

(*) Notice: Subject to any disclaimer, the term of this patent is extended or adjusted under 35 U.S.C. 154(b) by 866 days.

(21) Appl. No.: 12/695,874

(22) Filed: Jan. 28, 2010

(65) Prior Publication Data

US 2010/0195923 A1    Aug. 5, 2010

Related U.S. Application Data

(60) Division of application No. 11/342,258, filed on Jan. 27, 2006, now abandoned, which is a continuation of
(Continued)

(51) Int. Cl.
*G06F 17/14* (2006.01)
*H04N 19/60* (2014.01)
(Continued)

(52) U.S. Cl.
CPC ......... *G06F 17/147* (2013.01); *H04N 19/126* (2014.11); *H04N 19/18* (2014.11); *H04N 19/60* (2014.11)

(58) Field of Classification Search
None
See application file for complete search history.

(56) References Cited

U.S. PATENT DOCUMENTS 5,129,015 A   7/1992 Allen et al.
5,519,503 A   5/1996 Ohki
(Continued)

FOREIGN PATENT DOCUMENTS

CN   1829329 A    9/2006
CN   1874509 A    12/2006
(Continued)

OTHER PUBLICATIONS

Kwok-tung Lo, New Orthogonal Transform for Image Compression, 1993, pp. 1-4.*
(Continued)

*Primary Examiner* — Henry Tsai
*Assistant Examiner* — Dean Phan
(74) *Attorney, Agent, or Firm* — Alston & Bird LLP

(57) ABSTRACT

An approximation of a DCT and a quantization are to be applied subsequently to digital data for compression of this digital data. In order to improve the transform, a predetermined transform matrix is simplified to require less operations when applied to digital data. In addition, elements of the simplified transform matrix constituting irrational numbers are approximated by rational numbers. These measures are compensated by extending a predetermined quantization to include the operations which were removed in the simplification of the predetermined transform matrix. The included operations are further adjusted to compensate for the approximation of elements of the simplified transform matrix by rational numbers. If the simplified transform matrix and the extended quantization are used as basis for implementation, a fast transform with a good resulting quality can be achieved. An approximation of an IDCT employed in decompression of compressed digital data can be simplified correspondingly.

10 Claims, 2 Drawing Sheets

Related U.S. Application Data application No. 09/943,241, filed on Aug. 30, 2001, now Pat. No. 7,082,450.

(51) Int. Cl.
*H04N 19/126* (2014.01)
*H04N 19/18* (2014.01)

(56) References Cited

U.S. PATENT DOCUMENTS

| | | | |
|---|---|---|---|
| 5,523,847 A | 6/1996 | Feig et al. | |
| 5,572,236 A | 11/1996 | Feig et al. | |
| 5,625,713 A | 4/1997 | Allen et al. | |
| 5,642,438 A | 6/1997 | Babkin | |
| 5,748,786 A * | 5/1998 | Zandi et al. | 382/240 |
| 5,867,602 A * | 2/1999 | Zandi et al. | 382/248 |
| 5,907,635 A * | 5/1999 | Numata | 382/233 |
| 5,909,254 A * | 6/1999 | Feig et al. | 348/660 |
| 5,957,998 A | 9/1999 | Ozaki | |
| 6,189,021 B1 | 2/2001 | Shyu | |
| 6,222,944 B1 * | 4/2001 | Li et al. | 382/250 |
| 6,466,699 B1 | 10/2002 | Schwartz et al. | |
| 6,690,307 B2 | 2/2004 | Karczewicz | |
| 6,795,584 B2 | 9/2004 | Karczewicz et al. | |
| 6,856,701 B2 | 2/2005 | Karczewicz et al. | |
| 6,879,268 B2 | 4/2005 | Karczewicz | |
| 6,950,469 B2 | 9/2005 | Karczewicz et al. | |
| 7,082,450 B2 | 7/2006 | Hallapuro et al. | |
| 7,263,125 B2 | 8/2007 | Lainema | |
| 7,280,599 B2 | 10/2007 | Karczewicz et al. | |
| 7,652,595 B2 | 1/2010 | Niemi et al. | |
| 7,831,101 B2 | 11/2010 | Niemi et al. | |
| 7,847,711 B2 | 12/2010 | Niemi et al. | |
| 8,036,273 B2 | 10/2011 | Karczewicz et al. | |
| 8,175,148 B2 | 5/2012 | Lainema | |
| 8,275,041 B2 | 9/2012 | Ugur et al. | |
| 8,654,154 B2 | 2/2014 | Niemi et al. | |
| 8,687,891 B2 | 4/2014 | Takacs et al. | |
| 8,907,982 B2 | 12/2014 | Zontrop et al. | |
| 9,055,338 B2 | 6/2015 | Ridge et al. | |
| 2001/0031096 A1 | 10/2001 | Schwartz et al. | |
| 2005/0249291 A1 * | 11/2005 | Gordon | H04N 19/159 375/240.18 |

FOREIGN PATENT DOCUMENTS

| | | |
|---|---|---|
| CN | 101132534 A | 2/2008 |
| CN | 101232618 A | 7/2008 |
| CN | 101232622 A | 7/2008 |
| CN | 101261619 A | 9/2008 |
| CN | 101267563 A | 9/2008 |
| CN | 101658042 A | 2/2010 |
| CN | 101658044 A | 2/2010 |
| CN | 102238987 | 11/2011 |
| CN | 102844771 | 12/2012 |
| EP | 1 433 316 A1 | 6/2004 |
| EP | 1 435 063 A1 | 7/2004 |
| EP | 1 440 515 A1 | 7/2004 |
| EP | 1 546 995 A1 | 6/2005 |
| EP | 2 007 147 A1 | 12/2008 |
| EP | 2 118 847 A1 | 11/2009 |
| EP | 2 132 941 A2 | 12/2009 |
| EP | 2 137 981 A2 | 12/2009 |
| EP | 2 193 825 A1 | 6/2010 |
| JP | 06-113327 | 4/1994 |
| JP | 07-022959 | 1/1995 |
| JP | 07-046136 | 2/1995 |
| WO | 01/31906 | 5/2001 |

OTHER PUBLICATIONS

H.26L Test Model Long Term No. 7 (TML-7) Draft0, Gisle Bjontegaard, Document VCEG-M81, ITU Video Coding Experts Group, 2001, relevant pages thereof.

"A 16-bit Architecture for H.26L, Treating DCT Transforms and Quantization", Jie Liang et al., Document VCEG-M16, ITU Video coding Experts Group (VCEG), 2001, relevant pages thereof.

"Development of Integer Cosine Transforms by the Principle of Dyadic Symmetry", W.K. Cham, IEEE Proceedings, vol. 136, Pt. 1, No. 4, 1989, pp. 276-280.

Tran TD, "The binDCT: fast multiplierless approximation of the DCT", IEEE Signal Processing Letters, Jun. 2000, vol. 7, No. 6, pp. 141-144, Jun. 2000.

European Search Report dated Mar. 25, 2009.

Office Action from Japanese Patent Application No. 200810092105.9, dated Oct. 10, 2012.

Office Action from Chinese Patent Application No. 200810092105.9, dated Oct. 10, 2012.

International Search Report for International Patent Application No. WO2003/019787, dated Jun. 6, 2003, 4 pages.

Extended European Search Report for European Patent Application No. 08100326.1 dated Apr. 2, 2009, 5 pages.

Office Action for European Patent Application No. 08100326.1 dated Nov. 23, 2009, 3 pages.

Office Action for European Patent Application No. 02762664.7 dated Jan. 23, 2007, 7 pages.

Office Action for U.S. Appl. No. 09/943,241, dated Aug. 3, 2004, 7 pages.

Notice of Allowance for U.S. Appl. No. 09/943,241, dated May 26, 2005, 4 pages.

Notice of Allowance for U.S. Appl. No. 09/943,241, dated Oct. 27, 2005, 4 pages.

Office Action for U.S. Appl. No. 11/342,258, dated May 22, 2009, 6 pages.

Notice of Allowance for U.S. Appl. No. 11/342,258, dated Oct. 30, 2009, 4 pages.

Office Action for European Patent Application No. 08100326.1 dated Mar. 16, 2018, 3 pages.

Office Action for Indian Patent Application No. 6940/CHENP/2009 dated Jun. 15, 2017, 8 pages.

Office Action for European Application No. 08 100 326.1 dated Oct. 2, 2019.

* cited by examiner

IMPLEMENTATION OF A TRANSFORM AND OF A SUBSEQUENT QUANTIZATION

This application is a divisional of co-pending U.S. application Ser. No. 11/342,258, filed Jan. 27, 2006, which is a continuation of U.S. application Ser. No. 09/943,241, filed Aug. 30, 2001, issued as U.S. Pat. No. 7,082,450, which are incorporated herein by reference.

FIELD

The invention relates to the processing of digital data. It relates more specifically to a method for implementing an approximation of a discrete cosine transform (DCT) and a quantization, which transform and which quantization are to be applied subsequently to digital data, in particular digital image data, for compression of said digital data. It equally relates to a method for implementing a dequantization and an approximation of an inverse discrete cosine transform (IDCT), wherein for decompression of digital data said quantization is to be applied in sequence with said inverse transform to compressed digital data. Finally, the invention relates to an encoder and to a decoder suited to carry out such a compression and such a decompression respectively.

BACKGROUND

It is known from the state of the art to use a sequence of DCT and quantization for compressing digital data, for instance in order to enable an efficient transmission of this digital data. In particular a compression of digital image data is commonly achieved by using a DCT followed by a quantization of the DCT coefficients obtained by the DCT.

In a DCT of one-dimensional digital data, a respective sequence of source values of a predetermined number is transformed into transform coefficients. In video coding, the source values can be for instance pixel values or prediction error values. Each of the resulting transform coefficients represents a certain frequency range present in the source data. DCT of values f( ) into coefficients F( ) is defined as:

$$F(i) = \sqrt{\frac{2}{N}} C(i) \sum_{x=0}^{N-1} f(x)\cos\left(\frac{(2x+1)i\pi}{2N}\right), \quad i = 0, 1, \ldots, N-1$$

$$C(k) = \begin{cases} \frac{1}{\sqrt{2}}, & k = 0 \\ 1, & k \neq 0 \end{cases}$$

In this equation, N is the predetermined number of source values in one sequence of source values.

For compression, image data is usually provided in blocks of two-dimensional digital data. For such data DCT is defined as:

$$F(i, j) = \frac{2}{N} C(i)C(j) \sum_{x=0}^{N-1}\sum_{y=0}^{N-1} f(x, y)\cos\left(\frac{(2x+1)i\pi}{2N}\right)\cos\left(\frac{(2y+1)j\pi}{2N}\right),$$

$$i = j = 0, 1, \ldots, N-1$$

$$C(k) = \begin{cases} \frac{1}{\sqrt{2}}, & k = 0 \\ 1, & k \neq 0 \end{cases}$$

DCT is a separable operation. That means that a two-dimensional DCT can be calculated with two consecutive one-dimensional DCT operations. Using the one-dimensional DCT operation is preferred because the complexity of a one-dimensional DCT is relative to N, while the complexity of a two-dimensional DCT is relative to $N^2$. For image data having a size of N*N, the total complexity of all the DCT operations is relative to $N^3$ or $N^2 \log(N)$ for fast DCT. Thus large transforms, which also involve many non-trivial multiplications, are computationally very complex. Furthermore, the additionally required accuracy in bits may increase the word width. For complexity reasons DCT is commonly performed only for small block of values at a time, for example 4×4 or 8×8 values, which can be represented in form of a matrix with values f( ) FIG. 1 illustrates a DCT of such a 4×4 matrix 1.

First, each row of the matrix 1 is transformed separately to form a once transformed matrix 2. In the depicted matrix 1, a separate transformation of each row is indicated by 2-headed arrows embracing all values of the respective row. Then, each column of the once transformed matrix 2 is transformed separately to form the final transformed matrix 3 comprising the transform coefficients F( ). In the depicted matrix 2, a separate transformation of each column is indicated by 2-headed arrows embracing all values of the respective column.

The DCT defined by the above equation can also be written in matrix form. To this end, F(i) is first written in a more suitable form $$F(i) = \sum_{x=0}^{N-1} f(x)A(i,x), i = 0, 1, \ldots, N-1$$

$$A(i,x) = \sqrt{\frac{2}{N}} C(i)\cos\left(\frac{(2x+1)i\pi}{2N}\right)$$

Matrix A is a matrix of DCT basis functions. A two dimensional DCT can then be calculated with:

$$Y = AXA^T,$$

where matrix X denotes a source value matrix, and where matrix Y denotes the transform coefficients resulting in the DCT. The index T of a matrix indicates that the transpose of the matrix is meant.

After DCT, the actual compression is achieved by quantization of DCT coefficients. Quantization is achieved by dividing the transform coefficients with quantization values that depend on a quantization parameter qp:

$$Y'(i,j) = Y(i,j)/Q(qp)(i,j),$$

where Q(qp) is a quantization matrix, and where Y'(i,j) constitute quantized coefficients. The simplest form of quantization is uniform quantization where the quantization matrix is populated with one constant, for example:

$$Q(qp)(i,j) = qp.$$

The quantized coefficients constitute compressed digital data which has for example, after the encoding and possible further processing steps, a convenient form for transmission of said data.

When the compressed data is to be presented again after storing and/or transmission, it has first to be decompressed again.

Decompression is performed by reversing the operations done during compression. Thus, the quantized coefficients Y'(i,j) are inverse quantized in a first step by multiplying the quantized coefficients with values of quantization matrix:

$$Y(i,j)=Y'(i,j)Q(qp)(i,j)$$

Next, the dequantized but still transformed coefficients Y(i,j) are inverse transformed in a second step by an inverse discrete cosine transform (IDCT):

$$X=A^TYA,$$

where matrix Y denotes as in the DCT the transformed coefficients, and where matrix X denotes the regained source value matrix.

If infinite precision is used for all calculations, X will contain exactly the original pixel values. In practice, however, the coefficients are converted to integer values at least after quantization and inverse transform. As a result, the original pixels can not be exactly reconstructed. The more compression is achieved, the more deviation there is from the original pixels.

If the above described DCT and IDCT are implemented straight-forward, each conversion requires several multiplications, additions and/or subtractions. These operations, however, require on the one hand a significant amount of processor time, and on the other hand, multiplications are quite expensive operations with respect to circuit area in some architectures. In order to be able to transmit for example high quality motion displays, it is thus desirable to dispose of a conversion process which requires fewer multiplication steps without reducing the quality of the data regained in decompression.

Since the DCT is also a central operation in many image coding standards, it has been widely used, and a variety of solutions for the stated problem has been described in literature. These solutions generally feature the "butterfly operation" and/or combine some calculations from the operator matrix to the quantization step at the end of the DCT process.

The U.S. Pat. No. 5,523,847 describes for example a digital image processor for color image compression. In order to reduce the number of non-trivial multiplications in DCT, it is proposed in this document to factor the transform matrix in a way that decreases the number of non-trivial multiplications, non-trivial multiplications being multiplications or divisions by a factor other than a power of two. The trivial multiplications can be realized by bit-shifting, hence the name 'trivial'. More specifically, the transform matrix is factored into a diagonal factor and a scaled factor such that the diagonal factor can be absorbed into a later quantization step that and the scaled factor can be multiplied by a data vector with a minimum of non-trivial multiplications. In addition, it is proposed that remaining non-trivial multiplications are approximated by multiplications by rational numbers, since the computation can then be achieved only with additions, subtractions and shift operations. This leads to a problem in IDCT, however, since with the approximation, there may not exist an exact inverse transform any more for the transform. Therefore, repeating the DCT-IDCT process may result in severe deterioration in image quality. This may happen, e.g., when the image is transmitted several times over a communications link where DCT compression is utilized.

Another approach is described in a document by Gisle Bjontegaard: "H.26L Test Model Long Term Number 7 (TML-7) draft0", ITU Video Coding Experts Group, 13th Meeting, Austin, Tex., USA 2-4 Apr., 2001. This document describes a DCT solution constituting the current test model for a compression method for ITU-T recommendation H.26L.

According to this document, instead of DCT, an integer transform can be used which has basically the same coding property as a 4×4 DCT. In the integer transform, four transform coefficients are obtained from four source data pixels respectively by four linear equations summing the pixels with predetermined weights. The transform is followed or preceded by a quantization/dequantization process, which performs a normal quantization/dequantization. Moreover, a normalization is required, since it is more efficient to transmit data having a normalized distribution than to transmit random data. Since the transform does not contain a normalization, the quantization/dequantization carries out in addition the normalization which is completed by a final shift after inverse transform. The quantization/dequantization uses 32 different quality parameter (QP) values, which are arranged in a way that there is an increase in the step size of about 12% from one QP to the next. Disadvantage of this approach is that it requires a 32-bit arithmetic and a rather high number of operations.

Another document proceeds from the cited TML-7 document: "A 16-bit architecture for H.26L, treating DCT transforms and quantization", Document VCEG-M16, Video Coding Experts Group (VCEG) 13th meeting, Austin, USA, 2-4 Apr., 2001, by Jie Liang, Trac Tran, and Pankaj Topiwala. This VCEG-M16 document mainly addresses a 4×4 transform, and proposes a fast approximation of the 4-point DCT, named the binDCT, for the H.26L standard. This binDCT can be implemented with only addition and right-shift operations. The proposed solution can be implemented to be fully invertible for lossless coding.

The proposed binDCT is based on the known Chen-Wang plane rotation-based factorization of the DCT matrix. For a 16-bit implementation of the binDCT, a lifting scheme is used to obtain a fast approximation of the DCT. Each employed lifting step is a biorthogonal transform, and its inverse also has a simple lifting structure. This means that to invert a lifting step, it is subtracted out what was added in at the forward transform. Hence, the original signal can still be perfectly reconstructed even if the floating-point multiplication results are rounded to integers in the lifting steps, as long as the same procedure is applied to both the forward and the inverse transform.

To obtain a fast implementation, the floating-point lifting coefficients are further approximated by rational numbers in the format of k/2m, where k and m are integers, which can be implemented by only shift and addition operations. To further reduce the complexity of the lifting-based fast DCT, a scaled lifting structure is used to represent the plane rotation. The scaling factors can be absorbed in the quantization stage.

The solution proposed in the VCEG-M16 document only requires 16-bit operations assuming that the source values are 9-bit values and less operations than the solution of the TML-7 document. More specifically, it requires for a 1-D DCT of four data values 10 additions and 5 shifts.

Further documents relating to image data compression are for instance the following, the contents of which are only addressed briefly:

U.S. Pat. No. 6,189,021, granted Feb. 13, 2001, proposes to employ a set of scaled weighting coefficients in the intrinsic multiplication stage of a six-stage DCT fast algorithm for one of two one-dimensional DCT operations so that a corresponding stage of the DCT fast algorithm for the other one of the one-dimensional DCT operations can be omitted.

U.S. Pat. No. 5,129,015, granted Jul. 7, 1992, makes use of a method similar to DCT but employing a simpler arithmetic for compressing still images without multiplication.

U.S. Pat. No. 5,572,236, granted Nov. 5, 1996, relates to a digital image processor for color image compression which minimizes the number of non-trivial multiplications in the DCT process by rearranging the DCT process such that non-trivial multiplications are combined in a single process step.

PCT application WO 01/31906, published May 3, 2001, relates to a transform-based image compression framework called local zerotree coding.

SUMMARY

It is an object of the invention to reduce the operations required for conventional DCT and IDCT while avoiding the necessity of non-trivial multiplications. It is also an object of the invention to provide an alternative to known methods which requires less operations than the regular DCT or IDCT. It is further an object of the invention to guarantee a high quality of the digital data after decompression.

For compression of digital data, the objects of the invention are reached by a method comprising in a first step simplifying a predetermined transform matrix to require less operations when applied to digital data. In a second step, elements of the simplified transform matrix constituting irrational numbers are approximated by rational numbers. In order to compensate for these measures, a predetermined quantization is extended to include the operations which were removed in the simplification of the predetermined transform matrix. The included operations are further adjusted to compensate for the approximation of elements of the simplified transform matrix by rational numbers. Finally, the simplified transform matrix with the approximated elements and the extended quantization are employed as basis for implementing a sequence of a transform and a quantization which are to be applied to digital data that is to be compressed.

For decompression of compressed digital data, the objects are reached with a method in which a predetermined inverse transform matrix is processed according to the predetermined transform matrix in the proposed method for compression. In addition, a predetermined dequantization is extended according to the extension of the predetermined quantization in the proposed method for compression. The resulting extended dequantization and the resulting simplified inverse transform matrix with approximated elements can then be used as basis for implementing a sequence of a dequantization and an inverse transform which are to be applied to compressed digital data for achieving a decompression.

The objects of the invention are finally reached with an encoder comprising a corresponding transformer approximating a DCT and a corresponding quantization means, and with a decoder comprising a corresponding dequantization means and a corresponding transformer approximating an IDCT.

The invention proceeds from the idea that the number of operations required for a DCT can be reduced significantly, if on the one hand, operations are extracted from the transform matrix and absorbed in the quantization, and if on the other hand, the remaining entries not constituting a rational number are approximated by such a rational number. In order to ensure that decompression can be carried out correctly, however, it is proposed that in addition the approximation is compensated in the operations moved to the quantization.

It is an advantage of the invention that it enables a fast computation of the transform, since it enables a reduction of the number of required operations, e.g. compared to TML-7 and VCEG-M16, thus saving processor time. Still, the invention achieves a quality very close to the solution of the VCEG-M16 document. Since the invention moreover enables a consideration of the inversion properties of the transform operation by compensating the carried out approximations, a degradation of the quality of the processed data, especially at low bit rates, can be avoided. It is thus a further advantage of the invention that a better inversion accuracy is achieved compared e.g. to U.S. Pat. No. 5,523,847.

Preferred embodiments of the invention become apparent from the subclaims.

The proposed step of simplifying the predetermined transform matrix to require less operations when applied to digital data preferably comprises factoring the predetermined transform matrix into two factors, one factor constituting a diagonal matrix and the other factor constituting a simplified transform matrix. The diagonal matrix then comprises the operations removed from the simplified transform matrix.

Advantageously, the rational numbers by which the remaining entries of the simplified transform matrix are approximated are given by fractions with a denominator of $2^n$, wherein n is an integer. Such rational numbers are particularly suited for binary arithmetic, since a multiplication or division by $2^n$ can be realized by bit-shift operations. Thus all multiplications can be avoided in DCT with the proposed approximation.

For a given transform matrix, e.g. a 4×4 DCT matrix, and for a selected rational number for approximating remaining entries in the simplified matrix, a single set of equations including only additions, subtractions and shifts can then be determined for each one-dimensional transform that has to be performed for transforming one- or two-dimensional digital data values.

The adjustment to the approximation in the quantization step preferably ensures that the applied transform has an inverse transform. This can be achieved by ensuring that $A^T A = I$, where matrix A is in this case a matrix for which all extracted operations were re-included in the simplified transform matrix after approximation of the remaining entries and after compensation of the approximation in the extracted operations. This guarantees that an approximation of an IDCT can be performed with good quality.

For a given transform matrix, e.g. a 4×4 DCT matrix, and for a selected rational number for approximating remaining entries in the simplified matrix, also the required adjustment of specific values in the extracted operations can be calculated in a general way.

However, in larger transforms like the 8×8 transform, it may additionally be necessary to adjust the approximations of the simplified matrix, since approximating the DCT transform coefficients in an optimized implementation leads to a forward-inverse transform pair that is incomplete, leading to a "spill" of pixel values to non-adjacent, i.e. 2 pixels away, pixels. This results in blurring of the image. By a correct choice of the approximations, the off-diagonal elements of the matrix resulting from forward and inverse transform of a unity matrix are nullified. In very large matrices, it may not be possible to adjust the approximations sufficiently. In such cases, the approximations may be adjusted to produce an optimal result in the least-squares sense. Furthermore, optimization is needed to limit the solutions to a Dirichlet set, i.e., to certain rational numbers.

For the proposed quantization step, preferably a quantization matrix is determined by multiplying a predetermined sequence of quantization coefficients with a matrix extracted from the transform matrix for simplifying the transform matrix. The extracted matrix comprises the operations extracted from the predetermined transform matrix and is adjusted to compensate for the approximation of remaining entries in the simplified transform matrix by rational numbers.

The proposed method can be employed equally for one-dimensional as for a two-dimensional transforms. For a two-dimensional transform to be applied to two-dimensional digital data, simplification and approximation is carried out for the predetermined transform matrix and for the transpose of the simplified transform matrix. These two matrices are then employed as basis for implementing the transform. The extended quantization includes in this case operations removed from both of said matrices, which operations are adjusted to compensate for the approximations in both of said matrices.

The presented preferred embodiments can be employed not only for the method according to the invention for implementing transform and quantization, but in a corresponding manner also for the method for implementing inverse transform and dequantization, for the encoder and for the decoder according to the invention.

In practice, the transform matrices calculated for transform can usually be used in transposed form for inverse transform without performing any separate calculations, if the operator matrix for the transform is unitary, like a DCT transform matrix. In this case, equally the operations to be included in the extended quantization can be used at the same time for the extension of a predetermined dequantization.

The invention can be employed for the compression of any kind of digital data for any purpose, e.g. in a mobile communications system like GSM (Global System for Mobile communication) or UMTS (Universal Mobile Telecommunication System).

The invention can be implemented for example as a part of an MPEG codec.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims instead.

BRIEF DESCRIPTION OF THE FIGURES

In the following, the invention is explained in more detail with reference to drawings, of which

DETAILED DESCRIPTION

Figure 1:
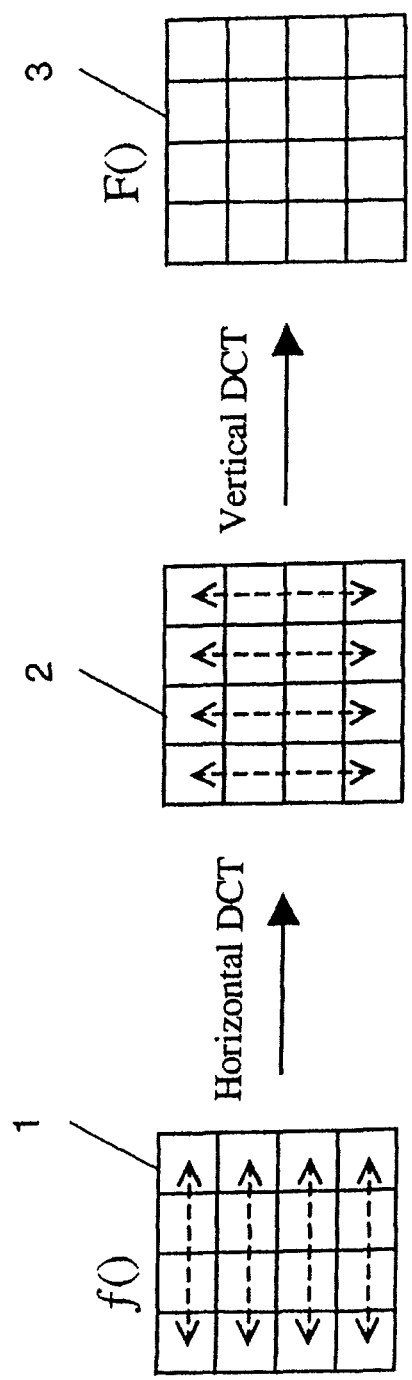
FIG. 1 illustrates a DCT applied to a matrix of 4×4 values.

FIG. 1 has already been described above.

Figure 2:
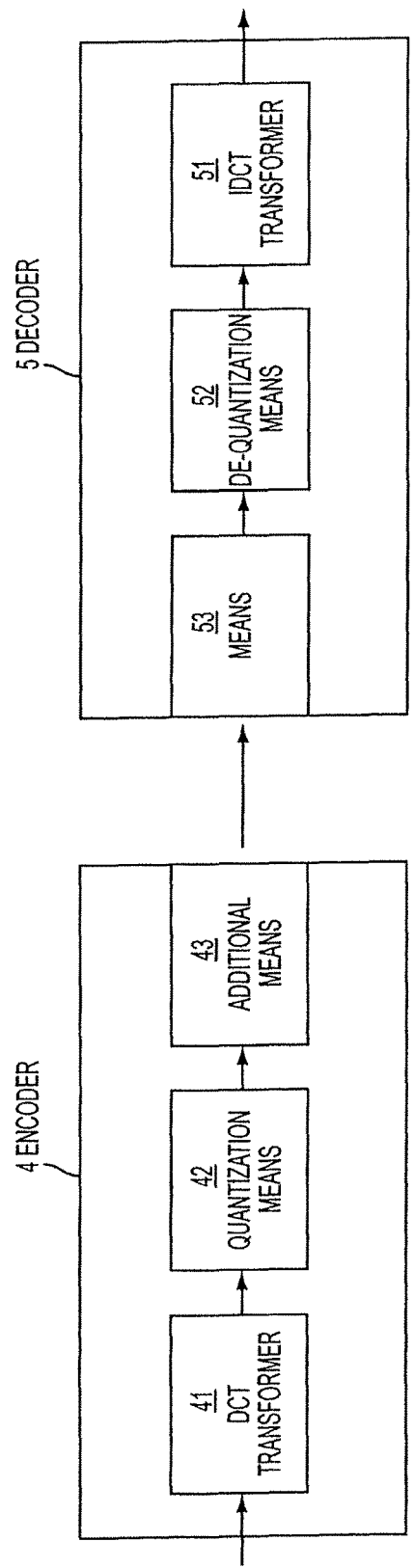
FIG. 2 schematically shows a block diagram of an encoder and of a decoder employed for compressing and decompressing digital data according to an embodiment of the invention.

The block diagram of FIG. 2 includes components of an exemplary system in which the invention can be realized. On the left-hand side of FIG. 2, an encoder 4 is depicted. The encoder 4 is part of a first unit, e.g. a piece of user equipment of a mobile communications system, capable of providing and transmitting video data. Connected between its input and its output, the encoder 4 comprises a DCT transformer 41, a quantization means 42 and additional means 43. On the right-hand side of FIG. 2, a decoder 5 is depicted. The decoder 5 is part of a second unit, e.g. equally a piece of user equipment of a mobile communications system, capable of receiving and displaying video data. Connected between its input and its output, the decoder 5 comprises a means 53, a dequantization means 53 and an IDCT transformer 51.

In case video data is to be transmitted from the first unit to the second unit, e.g. via a communications network, the video data is provided to the encoder 4 of the first unit as digital data. In the encoder 4, the digital data is first transformed by the DCT transformer 41, and then quantized by the quantization means 42. After quantization, the data is further processed by the additional means 43. This processing includes encoding of the quantized data for transmission, possibly preceded by a further compression, and is not dealt with in this document, since it is not relevant to the invention.

The processed data is then transmitted from the first unit comprising the encoder 4 to the second unit comprising the decoder 5. The second unit receives the data and forwards it to the decoder 5. In the decoder 5, in a first step some processing is carried out in the means 53, which processing corresponds in an inverse way to the processing in block 43 of the encoder 4. Thus, the processing, which is not dealt with in this document, may include decoding, followed possibly by a first step of decompression. The processed data is then dequantized by the dequantization means 52 and moreover subjected to an IDCT by the IDCT transformer 51. The regained video signals provided by the IDCT 51 are output by the decoder 5 for display by the second unit to a user.

An embodiment of an implementation according to the invention of the DCT transformer 41 and of the quantization means 42 of the encoder 4 of FIG. 2 will now be derived. For this implementation, which proceeds from the DCT and the quantization as described in the background of the invention, it is assumed that compression of input digital image data is to be carried out for blocks of digital data comprising 4×4 values. An embodiment of an implementation according to the invention of a corresponding decompression by the dequantization means 52 and the IDCT transformer 51 of the decoder 5 of FIG. 2 will be indicated as well.

It is to be noted that in the presented equations, the same denomination may be employed in different equations for different matrices. The kind of the respective matrices will be indicated for each equation at least if a corresponding denomination was used before for another kind of matrix.

In accordance with the above mentioned equation for DCT, $Y=AXA^T$, the 4×4 forward DCT transform can be calculated as follows:

$$Y = AXA^T = \begin{bmatrix} a & a & a & a \\ b & c & -c & -b \\ a & -a & -a & a \\ c & -b & b & -c \end{bmatrix} \cdot \begin{bmatrix} x_{11} & x_{12} & x_{13} & x_{14} \\ x_{21} & x_{22} & x_{23} & x_{24} \\ x_{31} & x_{32} & x_{33} & x_{34} \\ x_{41} & x_{42} & x_{43} & x_{44} \end{bmatrix} \cdot \begin{bmatrix} a & b & a & c \\ a & c & -a & -b \\ a & -c & -a & b \\ a & -b & a & -c \end{bmatrix},$$

where Y is the desired transformed matrix, where X is a matrix containing the 4×4 source values $x_{ij}$ (i,j=1-4), and where A is the 4×4 DCT transform matrix. The values a, b and c of matrix A can be obtained easily from the above definition for A(i,x):

$$a = \tfrac{1}{2}$$

$$b = \sqrt{\tfrac{1}{2}} \cdot \cos(\pi/8)$$

$$c = \sqrt{\tfrac{1}{2}} \cdot \cos(3\pi/8)$$

In the equation for the forward DCT, matrix A can be factorized, resulting in a diagonal matrix B and a simplified transform matrix C. A corresponding factorization can be carried out for the transposed form of A, $A^T$. If d is denoted in addition as d=c/b, the forward DCT can be written as $$Y = BCXC^T B = \begin{bmatrix} a & 0 & 0 & 0 \\ 0 & b & 0 & 0 \\ 0 & 0 & a & 0 \\ 0 & 0 & 0 & b \end{bmatrix} \cdot \begin{bmatrix} 1 & 1 & 1 & 1 \\ 1 & d & -d & -1 \\ 1 & -1 & -1 & 1 \\ d & -1 & 1 & -d \end{bmatrix} \cdot \begin{bmatrix} x_{11} & x_{12} & x_{13} & x_{14} \\ x_{21} & x_{22} & x_{22} & x_{24} \\ x_{31} & x_{32} & x_{33} & x_{34} \\ x_{41} & x_{42} & x_{43} & x_{44} \end{bmatrix} \cdot \begin{bmatrix} 1 & 1 & 1 & d \\ 1 & d & -1 & -1 \\ 1 & -d & -1 & 1 \\ 1 & -1 & 1 & -d \end{bmatrix} \cdot \begin{bmatrix} a & 0 & 0 & 0 \\ 0 & b & 0 & 0 \\ 0 & 0 & a & 0 \\ 0 & 0 & 0 & b \end{bmatrix}$$

Since B is a diagonal matrix, the above equation can be written as $$Y = D \otimes (CXC^T) \otimes D^T = \begin{bmatrix} a & a & a & a \\ b & b & b & b \\ a & a & a & a \\ b & b & b & b \end{bmatrix} \otimes \left( \begin{bmatrix} 1 & 1 & 1 & 1 \\ 1 & d & -d & -1 \\ 1 & -1 & -1 & 1 \\ d & -1 & 1 & -d \end{bmatrix} \cdot \begin{bmatrix} x_{11} & x_{12} & x_{13} & x_{14} \\ x_{21} & x_{22} & x_{22} & x_{24} \\ x_{31} & x_{32} & x_{33} & x_{34} \\ x_{41} & x_{42} & x_{43} & x_{44} \end{bmatrix} \cdot \begin{bmatrix} 1 & 1 & 1 & d \\ 1 & d & -1 & -1 \\ 1 & -d & -1 & 1 \\ 1 & -1 & 1 & -d \end{bmatrix} \right) \otimes \begin{bmatrix} a & b & a & b \\ a & b & a & b \\ a & b & a & b \\ a & b & a & b \end{bmatrix}$$

where $\otimes$ is used to indicate that the respective two matrices are multiplied entry-wise instead of a full matrix multiplication.

After combining D and its transposed form $D^T$ into E, the final DCT is:

$$Y = (CXC^T) \otimes E = \left( \begin{bmatrix} 1 & 1 & 1 & 1 \\ 1 & d & -d & -1 \\ 1 & -1 & -1 & 1 \\ d & -1 & 1 & -d \end{bmatrix} \cdot \begin{bmatrix} x_{11} & x_{12} & x_{13} & x_{14} \\ x_{21} & x_{22} & x_{22} & x_{24} \\ x_{31} & x_{32} & x_{33} & x_{34} \\ x_{41} & x_{42} & x_{43} & x_{44} \end{bmatrix} \cdot \begin{bmatrix} 1 & 1 & 1 & d \\ 1 & d & -1 & -1 \\ 1 & -d & -1 & 1 \\ 1 & -1 & 1 & -d \end{bmatrix} \right) \otimes \begin{bmatrix} a^2 & ab & a^2 & ab \\ ab & b^2 & ab & b^2 \\ a^2 & ab & a^2 & ab \\ ab & b^2 & ab & b^2 \end{bmatrix} = Y_C \otimes E$$

In a next step, the coefficient d is converted into a fixed-point format which can be represented by a rational fraction with a denominator of $2^n$. The value of d when considering eight decimal places is 0.41421356. Two of the possible fixed-point approximations for d are $3/8 = 0.375$ and $7/16 = 0.4375$, both of which can be implemented with the same number of add and shift operations. More accurate approximations such as $13/32$, $27/64$ and $53/128$ require more additions and shifts but do not improve the achieved compression significantly in practice. Thus, $7/16$, which is closer to d than $3/8$, is selected as fixed-point format for d.

After converting coefficient d to a fixed-point representation, b has to be adjusted in a way that the transform has an inverse transform. The condition for an inverse transform to exist is given by:

$$A^T A = 1.$$

When solving the above equation for a matrix A which was reassembled from factors B and C after the approximation of d, the condition for an adjusted b is found to be:

$$b = \sqrt{\frac{0.5}{1+d^2}}.$$

Matrix E is thus adjusted by substituting this new value for the old value of coefficient b.

Now, a simplified DCT can be implemented in the DCT transformer 41 of encoder 4 from which matrix E was extracted. That is, the implementation is based on the equation $Y_C = CXC^T$, wherein matrix C comprises approximated coefficients d, resulting in modified DCT coefficients $Y_C$. Matrix E will combined with the subsequent quantization step, as will be explained below.

The actual implementation of the simplified DCT may depend on a specific transformer architecture, in which it may be most important to have few total operations or to have no multiplications at all.

Two different sets of equations that can be employed in an implementation of the simplified DCT transformer will now be proposed. The equations are suited to perform a 4-point one-dimensional simplified DCT which is based on simplified DCT transform matrix C as derived above. In matrix C, coefficient d is chosen to be $d=7/16$. In both sets of equations, X[i], i=0-3 constitutes a sequence of 4 values that are to be transformed and Y[i], i=0-3 a sequence of 4 transformed values, while e and f are auxiliary variables.

The first proposed set of equations is:

$$e = X[0] + X[3]$$

$$f = X[1] + X[2]$$

$$Y[0] = e + f$$

$$Y[2] = e - f$$

$$e = X[0] - X[3]$$

$$f = X[1] - X[2]$$

$$Y[1] = e + 7*f/16$$

$$Y[3] = 7*e/16 - f$$

The two divisions in this set of equations are actually bit shifts. This set of equation thus requires 8 additions 2 multiplications and 2 shifts for a total of 12 operations.

The second proposed set of equations is:

$$e=X[0]+X[3]$$

$$f=X[1]+X[2]$$

$$Y[0]=e+f$$

$$Y[2]=e-f$$

$$e=X[0]-X[3]$$

$$f=X[1]-X[2]$$

$$Y[1]=e+(f-f/8)/2$$

$$Y[3]=(e-e/8)/2-f$$

The second set of equations uses only additions and shifts, and produces identical results to the first set. Again, divisions are actually bit shifts. This version requires 10 additions and 4 shifts for total of 14 operations. The number of operations is larger than in the first version, but the resulting complexity is still lower if multiplication is an expensive operation. Moreover, the results of a multiplication require a larger dynamic range.

Either set of equations can be used for transforming two-dimensional data by applying it to the respective set of values that is to be transformed.

The simplified transform is followed by an adapted quantization step. The implementation of the quantization depends on the used DCT. In the above mentioned TML-7 document, a uniform quantization is used. In fast DCT, a non-uniform quantization matrix must be used, since some of the DCT multiplications are combined with quantization multiplications. The above mentioned binDCT of document VCEG-M16 moreover uses divisions for quantization and requires only 16-bit operations. A division, however, is generally a rather slow operation. Therefore, in the presented embodiment a uniform quantization using only multiplications is implemented in quantization means 42.

As already mentioned above, quantization can be performed using division so that $$Y'(i,j)=Y(i,j)/Q(qp)(i,j).$$

Since division is a costly operation, multiplication can be used instead. For this purpose quantization matrix R is calculated as $$R(qp)(i,j)=1.0/Q(qp)(i,j),$$

after which quantization can be performed with multiplication:

$$Y'(i,j)=Y(i,j)R(qp)(i,j).$$

In the quantization proposed in document TML-7, the quantization coefficients are approximately as shown below. Other coefficients could be used as well.
a(qp)=
2.5000, 2.8061, 3.1498, 3.5354, 3.9684, 4.4543, 4.9998, 5.6120, 6.2992, 7.0706, 7.9364, 8.9082, 9.9990, 11.2234, 12.5978, 14.1404, 15.8720, 17.8155, 19.9971, 22.4458, 25.1944, 28.2795, 31.7424, 35.6293, 39.9922, 44.8894, 50.3863, 56.5562, 63.4817, 71.2552, 79.9806, 89.7745.

In order to be able to absorb the matrix E extracted from the DCT in the quantization, a quantization matrix R for quantization parameter qp is calculated as $$R(qp)(i,j)=E(i,j)/a(qp).$$

The final quantized coefficients Y'(i,j) could now be determined from the transform coefficients $Y_C(i,j)$ resulting in the simplified DCT by $$Y'(i,j)=Y_C(i,j)\cdot R(qp)(i,j)\pm f,$$

where f is ⅓ for intra blocks and ⅙ for inter blocks and has the same sign as $Y_C(i,j)$ in accordance with the TML-7 documentation. An intra block is a macroblock which is encoded based only on values within the current image, while an inter block is a macroblock which is encoded based in addition on values within other images. Each macroblock is composed of several subblocks, e.g. the blocks of 4×4 values of the presented example, which are DCT transformed and quantized separately.

First, however, the quantization is changed to use only fixed-point values. To this end, the values of R and f are converted prior to quantization to fixed point values by multiplying them by $2^n$ and by rounding the results to integer values. n is the number of fractional bits used for the fixed-point values. By choosing n=17, the coefficients of R will fit in 16-bit, and thus only 16-bit multiplications are required in quantization. More specifically, 16-bit multiplications are required that produce 32-bit results.

The fixed-point quantization is then implemented in quantization means 42 of encoder 4 based on the equation:

$$Y'(i,j)=(Y_C(i,j)\cdot R(qp)(i,j)\pm f)/2^n,$$

where R and f comprise only fixed-point values. The values of Y'(i,j) are output by the quantization means 42 as the desired compressed digital image data.

For decompression of the compressed digital image data in the decoder 5 of FIG. 2, the dequantization means 52 and the IDCT transformer 53 are implemented in a corresponding way as the quantization means 42 and the DCT transformer 41 of encoder 4. The basic IDCT is calculated from the basic DCT as:

$$X=A^T Y A,$$

where matrix X contains the desired, regained source values, where matrix A is the original DCT transform matrix, and where matrix Y contains dequantized values obtained by a decompression as described in the background of the invention.

Proceeding from this equation, the inverse transform can be formulated correspondingly to the forward transform using an extracted matrix E:

$$X=C^T(Y\otimes E)C.$$

where matrices C and $C^T$ correspond to the matrices C and $C^T$ used for the reduced DCT in block 41 of the encoder 4. Matrix E of this equation can be absorbed in the dequatization step preceding the IDCT.

This can be realized similarly to absorbing matrix E in quantization. Dequantization coefficients are inverse values of the quantization coefficients.

A dequantization matrix Q for a quantization parameter qp including matrix E can be calculated as:

$$Q(qp)(i,j)=E(i,j)\cdot a(qp).$$

The compressed coefficients Y'(i,j) can therefore be dequantized to dequantized coefficients X'(i,j) according to the equation:

$$X'(i,j)=Y'(i,j)\cdot Q(qp)(i,j).$$

In this equation, X'(i,j) corresponds to the term $Y\otimes E$ in the above equation for inverse transform $X=C^T(Y\otimes E)C$.

When fixed-point numbers are used, values of Q are converted to fixed-point values prior to dequantization by multiplying them by $2^n$ and rounding results to integer values. By choosing n=5 for dequantization, all calculations in dequantization can be done using only 16-bit operations. Fixed-point dequantization is then implemented in dequantization means 52 of decoder 5 based on the equation:

$$X'(i,j)=Y(i,j)\cdot Q(qp)(i,j),$$

in which Q contains only fixed-point numbers. After dequantization the values of X'(i,j) should be normalized by $2^n$, but normalization is postponed to be done after final IDCT in order to achieve a better accuracy.

The simplified inverse transform can then be implemented in the IDCT transformer 51 of decoder 5 according to the equation:

$$X=C^T X'C$$

after which fixed-point values of X are converted to integer values based on the equation:

$$X(i,j)=(X(i,j)+2^{n-1})/2^n,$$

where the division by $2^n$ is realized with a simple arithmetic bit-shift.

The actual implementation of the IDCT transformer 51 can comprise a set of equations including only additions, subtractions and shifts corresponding to those presented for the DCT transformer 41.

According to another embodiment of the invention, an 8×8 DCT and IDCT can be implemented as presented in the following. In accordance with the equation for DCT, Y=A× $A^T$, the 8×8 forward DCT transform can be calculated as follows:

$$Y = AXA^T = \begin{bmatrix} a & a & a & a & a & a & a & a \\ b & c & d & e & -e & -d & -c & -b \\ f & g & -g & -f & -f & -g & g & f \\ c & -e & -b & -d & d & b & e & -c \\ a & -a & -a & a & a & -a & -a & a \\ d & -b & e & c & -c & -e & b & -d \\ g & -f & f & -g & -g & f & -f & g \\ e & -d & c & -b & b & -c & d & -e \end{bmatrix} \cdot X \cdot A^T,$$

where Y is the desired transformed matrix, where X is a matrix containing the 8×8 source values $x_{ij}$ (i,j=1-8), as above in the 4×4 embodiment, where A is the 8×8 DCT transform matrix, written open on the right-hand side of the equation, and where $A^T$ is the transpose of A. The values a, b, c, d, e, f and g of matrix A can be obtained easily from the above definition for A(i,x):

$a=1/(2\sqrt{2})$ $b=\frac{1}{2}\cdot\cos(\pi/16)$ $c=\frac{1}{2}\cdot\cos(3\pi/16)$ $d=\frac{1}{2}\cdot\cos(5\pi/16)$ $e=\frac{1}{2}\cdot\cos(7\pi/16)$ $f=\frac{1}{2}\cdot\cos(\pi/8)$ $g=\frac{1}{2}\cdot\cos(3\pi/8)$ In the equation for the forward DCT, matrix A can be factorized, resulting in a diagonal matrix B and a simplified transform matrix C. A corresponding factorization can be carried out for the transposed form of A, $A^T$. If we use the notation $x_y=x/y$, the forward DCT can be written as $$Y = BCXC^T B = \begin{bmatrix} a & 0 & 0 & 0 & 0 & 0 & 0 & 0 \\ 0 & b & 0 & 0 & 0 & 0 & 0 & 0 \\ 0 & 0 & f & 0 & 0 & 0 & 0 & 0 \\ 0 & 0 & 0 & b & 0 & 0 & 0 & 0 \\ 0 & 0 & 0 & 0 & a & 0 & 0 & 0 \\ 0 & 0 & 0 & 0 & 0 & b & 0 & 0 \\ 0 & 0 & 0 & 0 & 0 & 0 & f & 0 \\ 0 & 0 & 0 & 0 & 0 & 0 & 0 & b \end{bmatrix}.$$

$$\begin{bmatrix} 1 & 1 & 1 & 1 & 1 & 1 & 1 & 1 \\ 1 & c_b & d_b & e_b & -e_b & -d_b & -c_b & -1 \\ 1 & g_f & -g_f & -1 & -1 & -g_f & g_f & 1 \\ c_b & -e_b & -1 & -d_b & d_b & 1 & e_b & -c_b \\ 1 & -1 & -1 & 1 & 1 & -1 & -1 & 1 \\ d_b & -1 & e_b & c_b & -c_b & -e_b & 1 & -d_b \\ g_f & -1 & 1 & -g_f & -g_f & 1 & -1 & g_f \\ e_b & -d_b & c_b & -1 & 1 & -c_b & d_b & -e_b \end{bmatrix} \cdot X \cdot C^T \cdot B$$

Since B is a diagonal matrix, the above equation can, as in the 4×4 case, be written as $$Y = D \otimes (CXC^T) \otimes D^T = \begin{bmatrix} a & a & a & a & a & a & a & a \\ b & b & b & b & b & b & b & b \\ f & f & f & f & f & f & f & f \\ b & b & b & b & b & b & b & b \\ a & a & a & a & a & a & a & a \\ b & b & b & b & b & b & b & b \\ f & f & f & f & f & f & f & f \\ b & b & b & b & b & b & b & b \end{bmatrix} \otimes$$

$$(CXC^T) \otimes \begin{bmatrix} a & b & f & b & a & b & f & b \\ a & b & f & b & a & b & f & b \\ a & b & f & b & a & b & f & b \\ a & b & f & b & a & b & f & b \\ a & b & f & b & a & b & f & b \\ a & b & f & b & a & b & f & b \\ a & b & f & b & a & b & f & b \\ a & b & f & b & a & b & f & b \end{bmatrix}$$

where $\otimes$ is used to indicate that the respective two matrices are multiplied entry-wise instead of a full matrix multiplication. After combining D and its transposed form $D^T$ into E, the final DCT is $$Y = (CXC^T) \otimes E =$$

$$\left( \begin{bmatrix} 1 & 1 & 1 & 1 & 1 & 1 & 1 & 1 \\ 1 & c_b & d_b & e_b & -e_b & -d_b & -c_b & -1 \\ 1 & g_f & -g_f & -1 & -1 & -g_f & g_f & 1 \\ c_b & -e_b & -1 & -d_b & d_b & 1 & e_b & -c_b \\ 1 & -1 & -1 & 1 & 1 & -1 & -1 & 1 \\ d_b & -1 & e_b & c_b & -c_b & -e_b & 1 & -d_b \\ g_f & -1 & 1 & -g_f & -g_f & 1 & -1 & g_f \\ e_b & -d_b & c_b & -1 & 1 & -c_b & d_b & -e_b \end{bmatrix} \cdot X \cdot C^T \right) \otimes$$

$$\begin{bmatrix} a^2 & ab & af & ab & a^2 & ab & af & ab \\ ab & b^2 & bf & b^2 & ab & b^2 & bf & b^2 \\ af & bf & f^2 & bf & af & bf & f^2 & bf \\ ab & b^2 & bf & b^2 & ab & b^2 & bf & b^2 \\ a^2 & ab & af & ab & a^2 & ab & af & ab \\ ab & b^2 & bf & b^2 & ab & b^2 & bf & b^2 \\ af & bf & f^2 & bf & af & bf & f^2 & bf \\ ab & b^2 & bf & b^2 & ab & b^2 & bf & b^2 \end{bmatrix} = Y_C \otimes E$$

In a next step, the coefficients $c_b$, $d_b$, $e_b$ and $g_f$ are converted into a fixed-point format which can be represented by a rational fraction with a denominator of $2^n$. Close approximations are $c_b = 7/8$, $d_b = 9/16$, $e_b = 3/16$ and $g_f = 7/16$.

After converting coefficients $c_b$, $d_b$, $e_b$ and $g_f$ to a fixed-point representation, b and f have to be adjusted in a way that the transform has an inverse transform. The condition for an inverse transform to exist is again given by:

$A^T A = I.$

When solving the above equation for a matrix A which was reassembled from factors B and C after the approximation of $c_b$, $d_b$, $e_b$ and $g_f$, the condition for adjusted b and f are found to be:

$$b = \frac{1}{\sqrt{2}} \frac{1}{\sqrt{1 + c_b^2 + d_b^2 + e_b^2}},$$

$$f = \frac{1}{2} \frac{1}{\sqrt{1 + g_f^2}}.$$

Matrix E is thus adjusted by substituting these new value for the old value of coefficients b and f.

However, to fulfill the condition $A^T A = I$, the values for $c_b$, $d_b$ and $e_b$ have to be chosen differently, since otherwise the product $A^T A$ features non-zero off-diagonal elements. The necessary condition for the 8×8 case is $d_b - c_b + e_b (d_b + c_b) = 0,$ which can be fulfilled by choosing $c_b = 15/16$, $d_b = 9/16$ and $e_b = 1/4$.

Now, a simplified DCT can again be implemented in the DCT transformer 41 of encoder 4 from which matrix E was extracted. That is, the implementation is based on the equation $Y_C = C \times C^T$, wherein matrix C comprises approximated coefficients $c_b$, $d_b$, $e_b$ and $g_f$, resulting in modified DCT coefficients $Y_C$. Matrix E will be combined with the subsequent quantization step similarly as explained above for the 4×4 DCT.

According to a third embodiment of the invention, the approximations are adjusted for the condition $A^T A = I$ by optimizing the selection of fractional numbers in the transform. The fractional numbers are selected so that the off-diagonal elements of the matrix $A^T A$ are as close to zero as possible in the implementation sense. The solution of the optimization is limited to a Dirichlet set, i.e., to certain rational numbers.

According to a fourth embodiment of the invention approximations of a fast-DCT algorithm are adjusted for the condition $A^T A = I$ by optimizing the selection of fractional numbers in the transform.

In the whole, it becomes apparent from the described embodiments of the invention that efficient alternative implementations for compressing digital data are presented. The implementation can be realized to be either more accurate than known implementations or faster or both.

Thus, while there have been described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method implemented by a decoder of a mobile communications system, the method comprising:
receiving quantized transform coefficients, wherein the quantized transform coefficients comprise different quantized coefficients for at least one intra block of image data and at least one inter block of image data;
dequantizing the quantized transform coefficients with the decoder, to generate dequantized transform coefficients, wherein the dequantization is performed by multiplying the dequantized transform coefficients by a fixed-point number and the dequantization is performed using only 16-bit operations;
performing an inverse transform process to the dequantized transform coefficients with the decoder by applying only addition, subtraction and bit-shift operations wherein the inverse transform process is orthogonal; and
wherein the inverse transform process corresponds to a transformation matrix given by:

$$\begin{bmatrix} 1 & 1 & 1 & d \\ 1 & d & -1 & -1 \\ 1 & -d & -1 & 1 \\ 1 & -1 & 1 & -d \end{bmatrix},$$

wherein d is a rational number having a denominator equal to $2^n$, wherein n is an integer.

2. A method according to claim 1, wherein the elements of the inverse transform process and the dequantization process are determined by:
  factorizing an inverse discrete cosine transform matrix into a product of matrices, at least one of the matrices being a diagonal matrix and at least one of the matrices being a non-diagonal simplified inverse transform matrix comprising elements constituting irrational numbers;
  approximating elements of the non-diagonal simplified inverse transform matrix constituting irrational numbers by rational numbers to form a further simplified inverse transform matrix;
  adjusting elements of the diagonal matrix to compensate for the approximation of elements of the non-diagonal simplified inverse transform matrix by rational numbers such that a product of a reassembled matrix and the transpose of the reassembled matrix is equal to the identity matrix, when the reassembled matrix is formed from the further simplified inverse transform matrix and the adjusted diagonal matrix; and
  calculating elements of a dequantization matrix based on a quantization parameter and on the adjusted elements of the diagonal matrix.

3. A method implemented by an encoder of a mobile communications system, the method comprising:
  performing a forward transform process with the encoder to a block of image data to form a block of transform coefficients by applying only addition, subtraction and bit-shift operations, wherein the forward transform process is orthogonal;
  quantizing the transform coefficients with the encoder, wherein the quantization is performed by multiplying the transform coefficients by a fixed-point number and a bit-shift operation, and the quantization is performed using only 16-bit arithmetic operations, wherein the transform coefficients comprise different quantized coefficients for at least one intra block of image data and at least one inter block of image data; and
  wherein the transform process corresponds to a transformation matrix given by $$\begin{bmatrix} 1 & 1 & 1 & 1 \\ 1 & d & -d & -1 \\ 1 & -1 & -1 & 1 \\ d & -1 & 1 & -d \end{bmatrix},$$

wherein d is a rational number having a denominator equal to $2^n$, wherein n is an integer.

4. A method according to claim 3, wherein the elements of the transform process and the quantization process are determined by:
  factorizing a discrete cosine transform matrix into a product of matrices, at least one of the matrices being a diagonal matrix and at least one of the matrices being a non-diagonal simplified transform matrix comprising elements constituting irrational numbers;
  approximating elements of the non-diagonal simplified transform matrix constituting irrational numbers by rational numbers to form a further simplified transform matrix;
  adjusting elements of the diagonal matrix to compensate for the approximation of elements of the non-diagonal simplified transform matrix by rational numbers such that a product of a reassembled matrix and the transpose of the reassembled matrix is equal to the identity matrix, when the reassembled matrix is formed from the further simplified transform matrix and the adjusted diagonal matrix; and
  calculating elements of a quantization matrix based on a quantization parameter and on the adjusted elements of the diagonal matrix.

5. An apparatus of a mobile communications system, the apparatus comprising:
  means of a decoder for dequantizing quantized transform coefficients, wherein the dequantization is performed by multiplying the dequantized coefficients by a fixed-point number and the dequantization is performed using only 16-bit operations, wherein the quantized transform coefficients comprise different quantized coefficients for at least one intra block of image data and at least one inter block of image data;
  means of the decoder for performing an inverse transform process to the dequantized transform coefficients by applying only addition, subtraction and bit-shift operations, wherein the inverse transform process is orthogonal; and
  wherein the inverse transform process corresponds to a transformation matrix given by:

$$\begin{bmatrix} 1 & 1 & 1 & d \\ 1 & d & -1 & -1 \\ 1 & -d & -1 & 1 \\ 1 & -1 & 1 & -d \end{bmatrix},$$

wherein d is a rational number having a denominator equal to $2^n$, wherein n is an integer.

6. An apparatus according to claim 5, wherein the apparatus comprises means of the decoder for determining elements of the inverse transform process and the dequantization process by:
  factorizing an inverse discrete cosine transform matrix into a product of matrices, at least one of the matrices being a diagonal matrix and at least one of the matrices being a non-diagonal simplified inverse transform matrix comprising elements constituting irrational numbers;
  approximating elements of the non-diagonal simplified inverse transform matrix constituting irrational numbers by rational numbers to form a further simplified inverse transform matrix;
  adjusting elements of the diagonal matrix to compensate for the approximation of elements of the non-diagonal simplified inverse transform matrix by rational numbers such that a product of a reassembled matrix and the transpose of the reassembled matrix is equal to the identity matrix, when the reassembled matrix is formed from the further simplified inverse transform matrix and the adjusted diagonal matrix; and
  calculating elements of a dequantization matrix based on a quantization parameter and on the adjusted elements of the diagonal matrix.

7. An apparatus of a mobile communications system, the apparatus comprising:
  means of an encoder for performing a forward transform process to a block of image data to form a block of transform coefficients by applying only addition, subtraction and bit-shift operations, wherein the forward transform process is orthogonal; and means of the encoder for quantizing transform coefficients, wherein the quantization is performed by multiplying the transform coefficients by a fixed-point number and a bit-shift operation, and the quantization is performed using only 16-bit arithmetic operations, wherein the transform coefficients comprise different quantized coefficients for at least one intra block of image data and at least one inter block of image data; and wherein the transform process corresponds to a transformation matrix given by $$\begin{bmatrix} 1 & 1 & 1 & 1 \\ 1 & d & -d & -1 \\ 1 & -1 & -1 & 1 \\ d & -1 & 1 & -d \end{bmatrix},$$

wherein d is a rational number having a denominator equal to $2^n$, wherein n is an integer.

8. An apparatus according to claim 7, wherein the apparatus comprises means of the encoder for determining elements of the transform process and the quantization process by:

factorizing a discrete cosine transform matrix into a product of matrices, at least one of the matrices being a diagonal matrix and at least one of the matrices being a non-diagonal simplified transform matrix comprising elements constituting irrational numbers; approximating elements of the non-diagonal simplified transform matrix constituting irrational numbers by rational numbers to form a further simplified transform matrix;

adjusting elements of the diagonal matrix to compensate for the approximation of elements of the non-diagonal simplified transform matrix by rational numbers such that a product of a reassembled matrix and the transpose of the reassembled matrix is equal to the identity matrix, when the reassembled matrix is formed from the further simplified transform matrix and the adjusted diagonal matrix; and calculating elements of a quantization matrix based on a quantization parameter and on the adjusted elements of the diagonal matrix.

9. An apparatus of a decoder of a mobile communications system, the apparatus comprising at least:

an input configured to receive quantized transform coefficients; and a processor configured to:

dequantize the quantized transform coefficients, wherein the dequantization is performed by multiplying the dequantized coefficients by a fixed-point number and the dequantization is performed using only 16-bit operations, wherein the quantized transform coefficients comprise different quantized coefficients for at least one intra block of image data and at least one inter block of image data; and perform an inverse transform process to the dequantized transform coefficients by applying only addition, subtraction and bit-shift operations, wherein the inverse transform process is orthogonal, wherein the inverse transform process corresponds to a transformation matrix given by:

$$\begin{bmatrix} 1 & 1 & 1 & d \\ 1 & d & -1 & -1 \\ 1 & -d & -1 & 1 \\ 1 & -1 & 1 & -d \end{bmatrix},$$

wherein d is a rational number having a denominator equal to $2^n$, wherein n is an integer.

10. An apparatus of an encoder of a mobile communications system, the apparatus comprising at least:

an input configured to receive image data; and a processor configured to:

perform a forward transform process to a block of the image data to form a block of transform coefficients by applying only addition, subtraction and bit-shift operations, wherein the forward transform process is orthogonal, wherein the transform process corresponds to a transformation matrix given by $$\begin{bmatrix} 1 & 1 & 1 & 1 \\ 1 & d & -d & -1 \\ 1 & -1 & -1 & 1 \\ d & -1 & 1 & -d \end{bmatrix},$$

wherein d is a rational number having a denominator equal to $2^n$, wherein n is an integer; and quantize transform coefficients, wherein the quantization is performed by multiplying the transform coefficients by a fixed-point number and a bit-shift operation, and the quantization is performed using only 16-bit arithmetic operations, wherein the transform coefficients comprise different quantized coefficients for at least one intra block of image data and at least one inter block of image data.

* * * * *